United States Patent [19]

Stone

[11] Patent Number: 5,271,226
[45] Date of Patent: Dec. 21, 1993

[54] HIGH SPEED, AMPLITUDE VARIABLE THRUST CONTROL

[75] Inventor: William C. Stone, Derwood, Md.

[73] Assignee: The United States of America, as represented by the Secretary of Commerce, Washington, D.C.

[21] Appl. No.: 873,020

[22] Filed: Apr. 24, 1992

[51] Int. Cl.$^5$ .............................. F02K 3/00
[52] U.S. Cl. ............................ 60/233; 60/258; 239/102.2; 251/129.2
[58] Field of Search .......... 60/233, 258; 251/129.2; 239/102.2

[56] References Cited

U.S. PATENT DOCUMENTS

| | | | |
|---|---|---|---|
| 3,055,631 | 9/1962 | Kippenhan | 251/129 |
| 3,178,884 | 4/1965 | Boardman, Jr. | 60/258 |
| 3,279,190 | 10/1966 | Shiley | 60/258 |
| 3,358,456 | 12/1967 | Lehrer | 60/258 |
| 3,544,061 | 12/1970 | Moy et al. | 60/258 |
| 3,742,701 | 7/1973 | Feemster et al. | 60/258 |
| 4,431,136 | 2/1984 | Janner et al. | 239/102 |
| 4,593,658 | 6/1986 | Moloney | 123/90.11 |
| 4,644,212 | 2/1987 | Moritugu et al. | 310/317 |
| 4,669,660 | 6/1987 | Weber et al. | 239/102.2 |
| 4,720,077 | 1/1988 | Minoura et al. | 239/102.2 |
| 4,725,002 | 2/1988 | Trachte | 239/102.2 |
| 4,750,706 | 6/1988 | Schlagmuller | 239/102.2 |
| 5,025,766 | 6/1991 | Yamauchi et al. | 123/472 |
| 5,029,610 | 7/1991 | Hiratsuka et al. | 137/557 |
| 5,094,429 | 3/1992 | Dostert | 239/102.2 |

FOREIGN PATENT DOCUMENTS

| | | | |
|---|---|---|---|
| 0202362 | 11/1983 | Japan | 239/102.2 |
| 0204961 | 11/1983 | Japan | 239/102.2 |
| 0206671 | 11/1984 | Japan | 239/102.2 |
| 2165308 | 4/1986 | United Kingdom | 239/102.2 |

OTHER PUBLICATIONS

N. Kattchee; Piezoelectric Injection System For Vernier Impulse Thrusters, (Jun. 1967), pp. 1–74.
Carasso and Simiu; Estimation Of Dynamic Green's Functions for Large Space Structures . . . (date unknown), National Engineering Laboratory, National Bureau of Standards.
"Reaction Controllers Maintain Attitude of Space Vehicles", Control Engineering, vol. 7, No. 1, Jan. 1960, p. 151.

Primary Examiner—Richard A. Bertsch
Assistant Examiner—Howard R. Richman
Attorney, Agent, or Firm—Harris & Burdick

[57] ABSTRACT

A high speed control apparatus and method utilized in a system having a high pressure fluid supply for producing precisely controlled, amplitude and duration variable thrust are disclosed, the apparatus including a cofired piezoelectric stack connected with a control signal input, a low-loss mechanical displacement amplifier operatively associated with the stack, and a high pressure spring-loaded axial valve assembly coupled with the amplifier. A microprocessor control system and energy storage and power amplifier system are utilized to provide a calibrated output voltage control signal which drives the piezoelectric stack in such a manner as to produce rapidly changing displacements in the stack (as frequent as 10 microseconds) which are subsequently amplified by the displacement amplifier. The valve assembly is connected with the amplifier and includes a valve core which is normally forced closed upon a valve seat by a compression spring. As the piezoelectric stack expands upon application of a step change in voltage, the valve core is lifted off the seat permitting fluid to expand through the seat and create thrust that is substantially equal in duration and directly proportional in amplitude to the control signal.

20 Claims, 11 Drawing Sheets

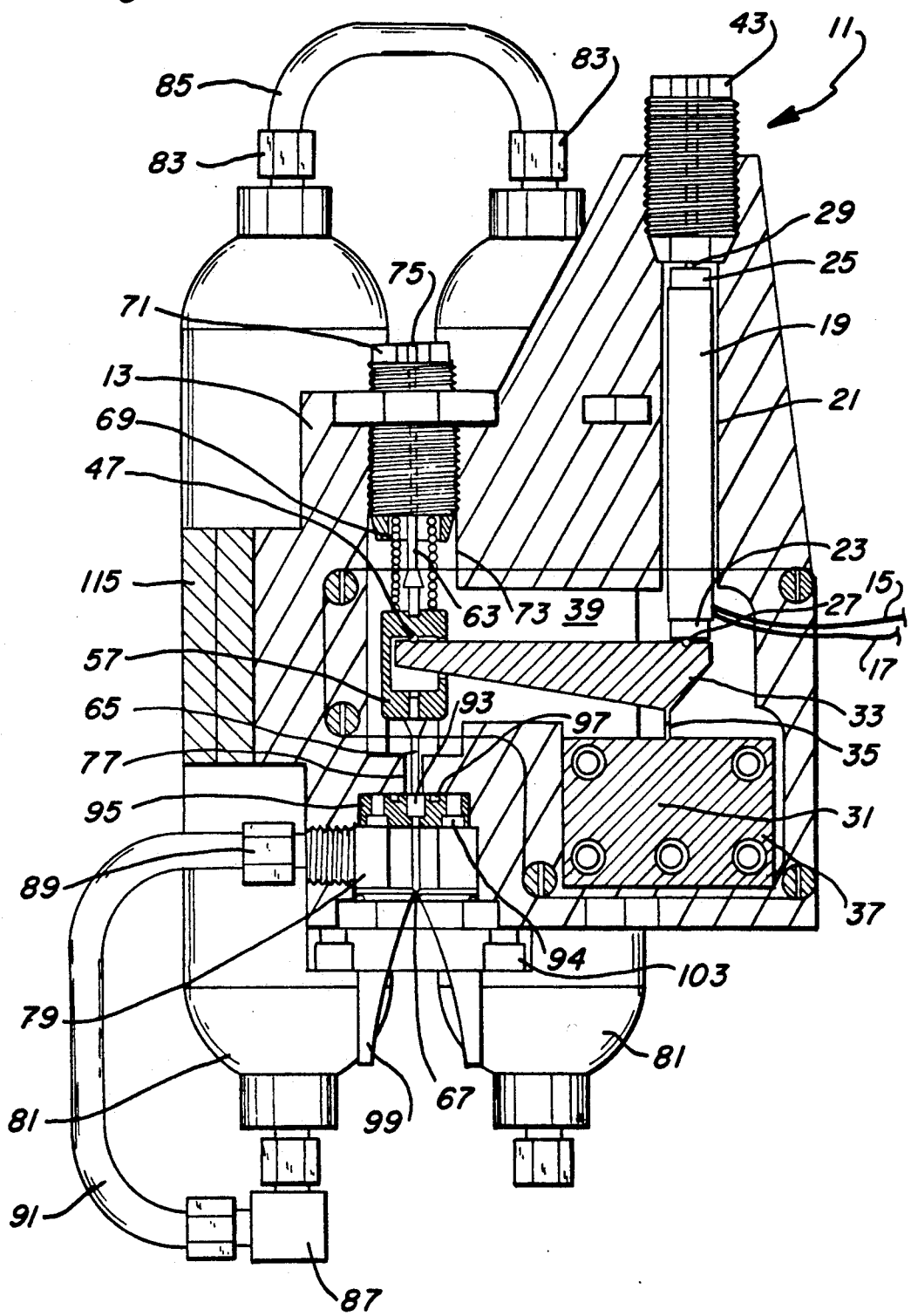
Fig_1

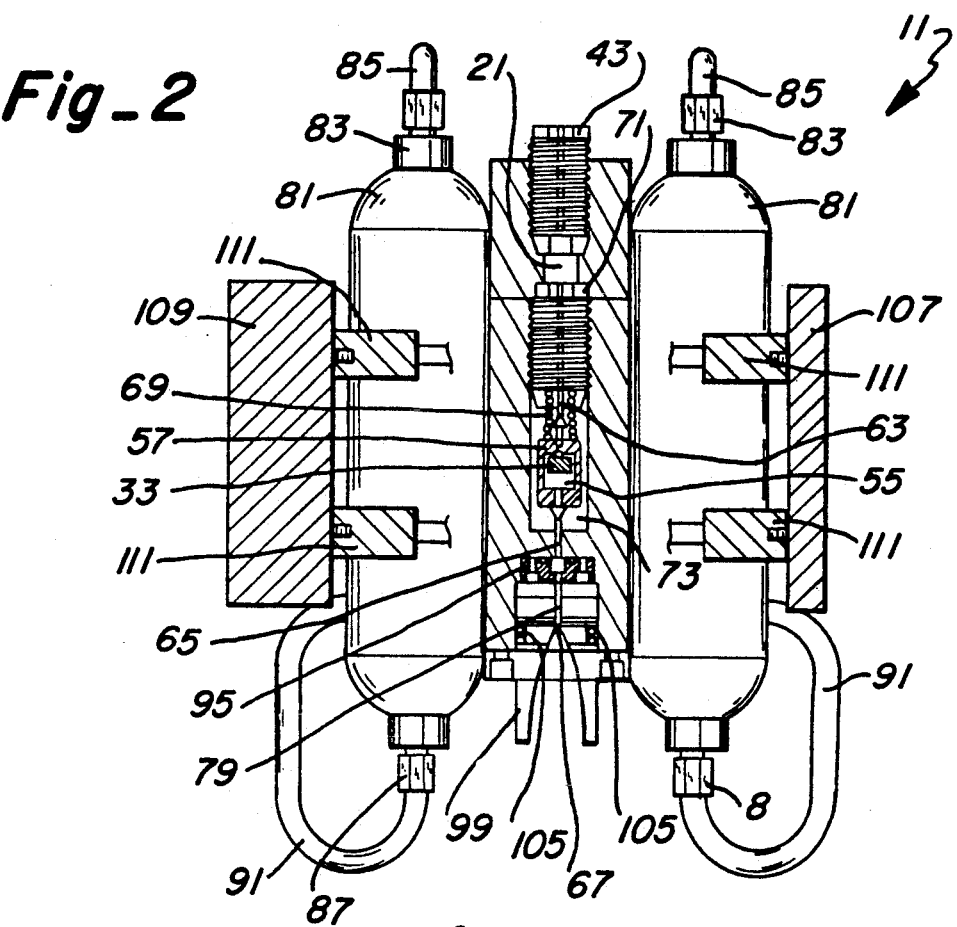
Fig_2
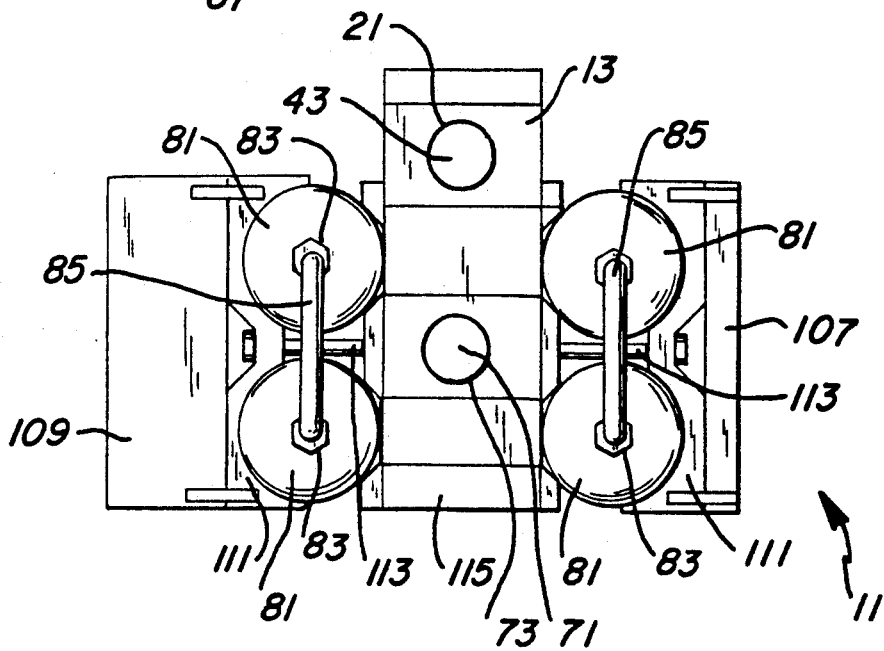
Fig_3

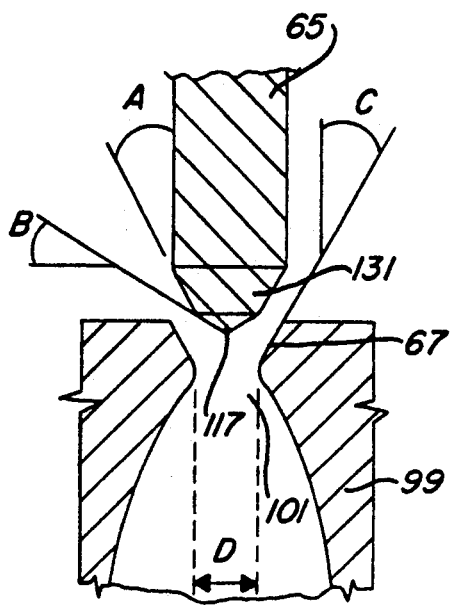
Fig_6
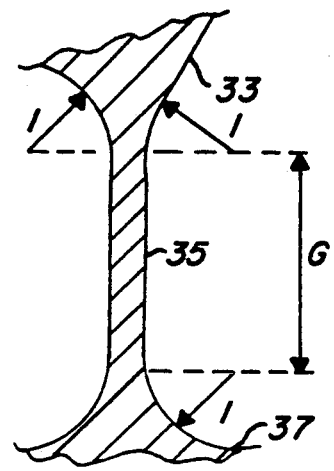
Fig_7C
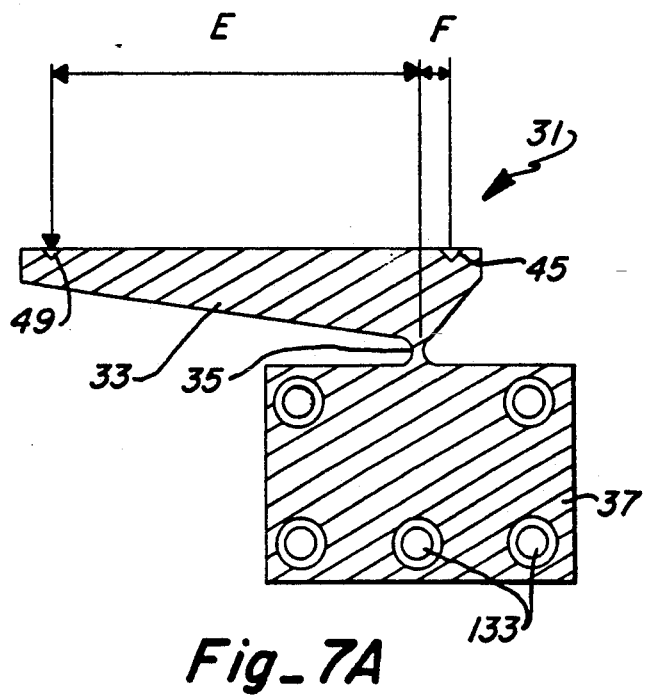
Fig_7A
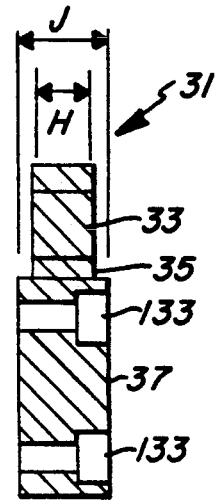
Fig_7B

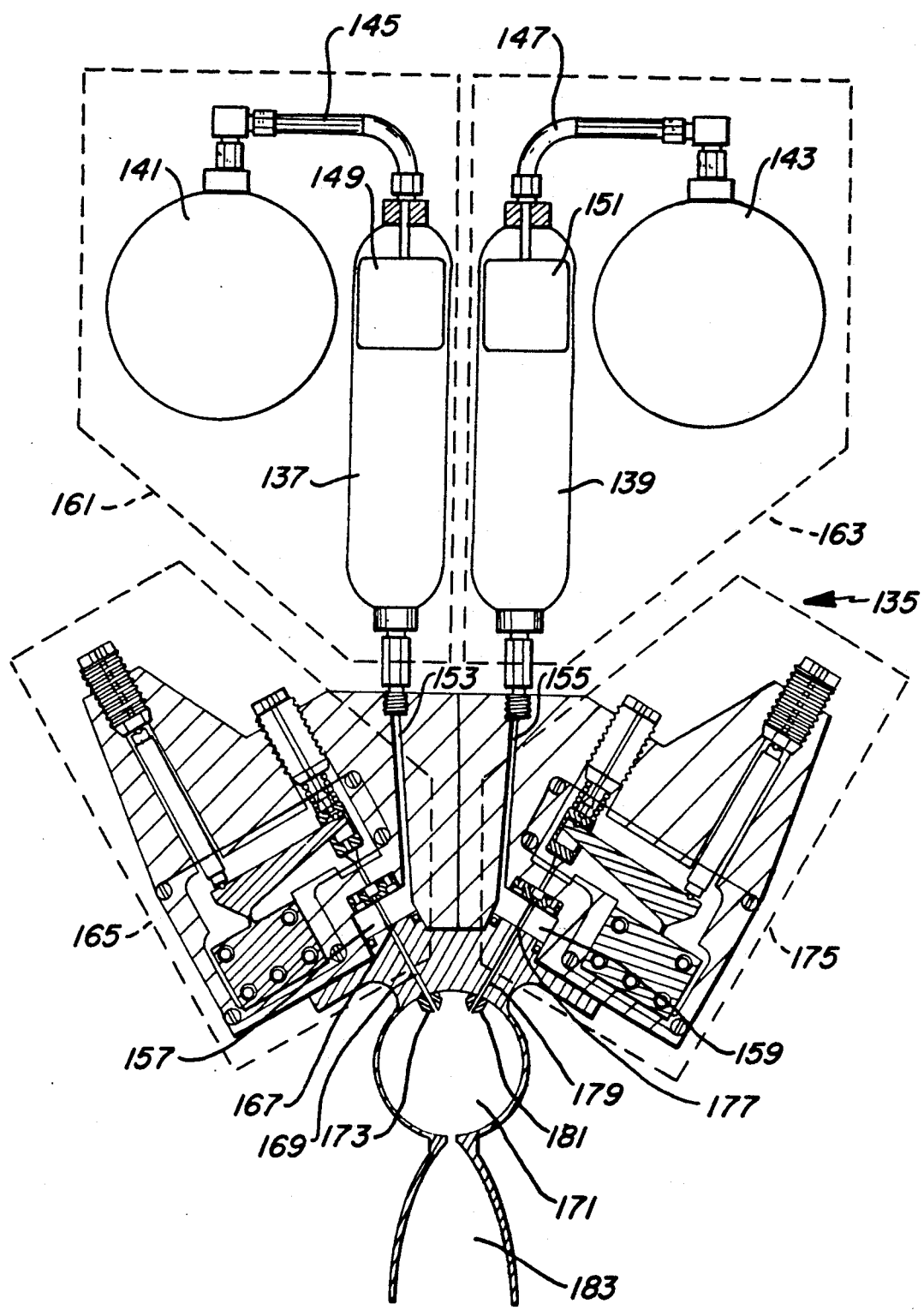
Fig_8

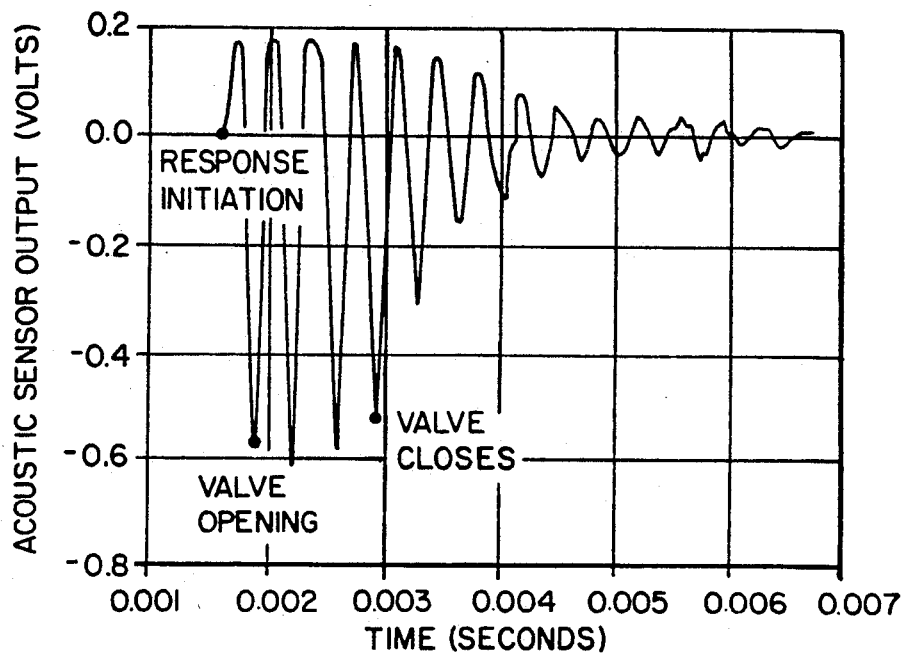
Fig_9A
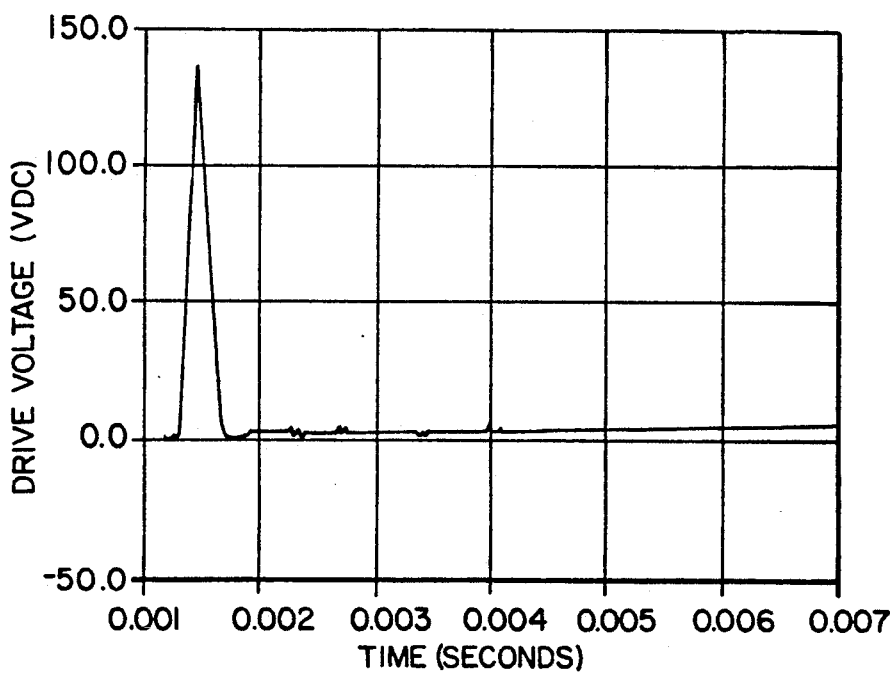
Fig_9B

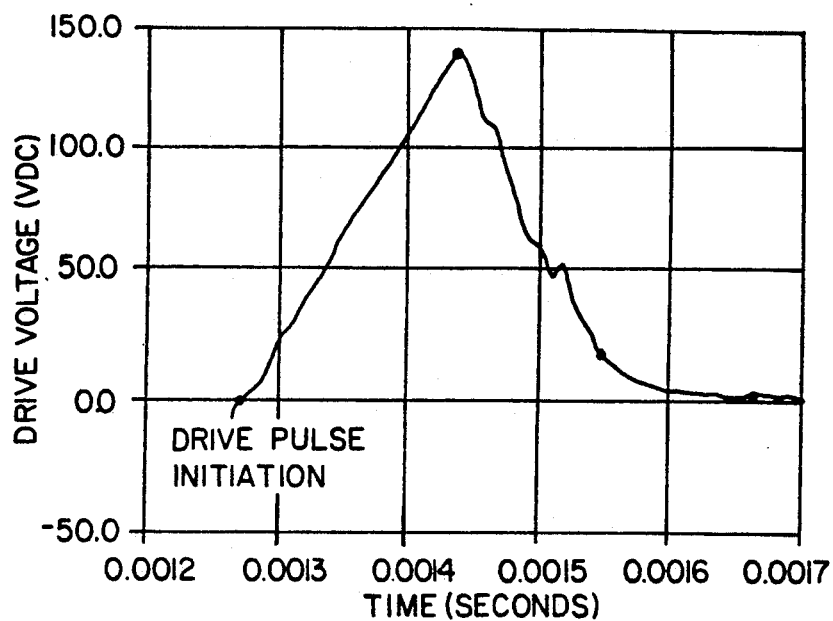
Fig_10
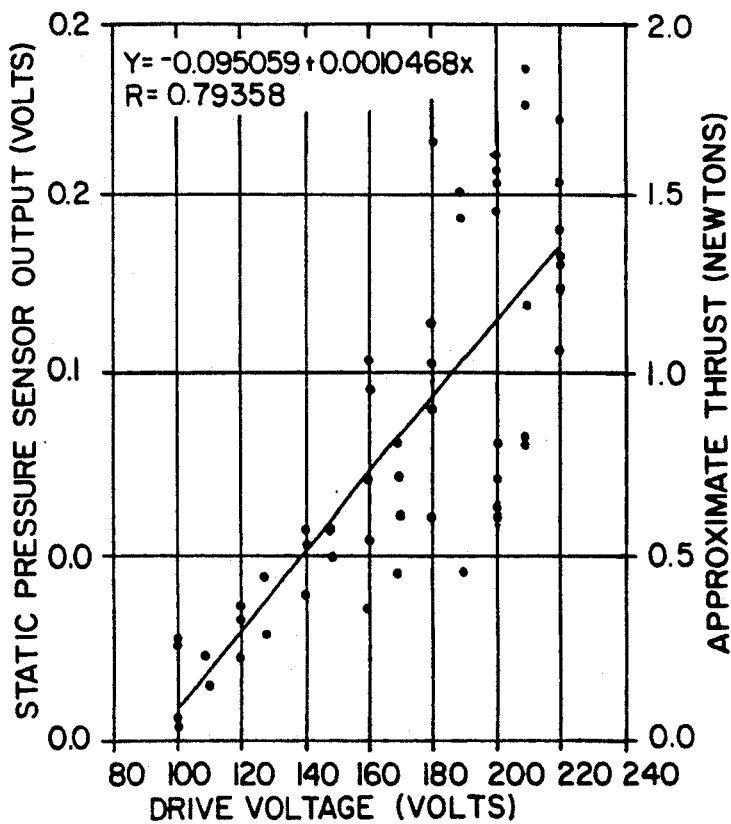
Fig_11

"HIGH SPEED, AMPLITUDE VARIABLE THRUST CONTROL

FIELD OF THE INVENTION

This invention relates to loading systems, and, more particularly, relates to thrust control apparatus and methods.

BACKGROUND OF THE INVENTION

Apparatus and methods for introducing a force into a mechanical structure or structural system consisting of one or more rigid bodies or flexible elements have hereto for been known and/or utilized. It would be advantageous for the purposes of active control and/or damping of the structure or structural system when subjected to random and/or unwanted excitation forces, or for the purpose of structural identification (i.e., determination of the dynamic characteristics which make a particular structure unique such as its mode shapes and frequencies) for such introduced forces to be capable of following a predetermined variation in time which may either be harmonic or non-harmonic in nature. It is furthermore advantageous, both from the control and identification viewpoint, for the force-time history imparted to the structure to be capable of being varied at an extremely rapid rate while still maintaining "intelligence", that is, a pre-determined, analytically definable shape.

For example, it has been shown that it is possible to recover the dynamic characteristics of a structure with greater reliability, and to a higher degree of precision, if the structure can be excited with a force-time pulse which is analytically defined by an inverse gaussian distribution (see Carasso, A. S., and Simiu, E., "Estimation of Dynamic Green's Functions For Large Space Structures By Pulse Probing and Deconvolution"). Furthermore, the ability to load the test structure with as short (time duration) an inverse gaussian pulse as possible will enable the capture of a higher number of mode shapes, and therefore yield more precise knowledge of the dynamic characteristics of the structure. Such precision and speed of response of the force generation system is of particular use in the control of spacecraft and orbiting structures and for the control of flexible robotic systems, although the technique is equally applicable to, for example, the active control of a tall building subjected to earthquake loads.

It is a required characteristic of most such control-/identification loading systems that they be capable of operating without the presence of a reaction surface, frame, or other interacting structure. This requirement is most obvious for the case of the control of spacecraft and orbiting structural systems.

Existing controlled-force generation technology includes closed loop servo-hydraulic and servo-pneumatic loading equipment now in common use for structural testing and industrial fabrication. Such equipment works on the principle of directing a pressurized fluid (either hydraulic oil or compressed air) from a pressurized reservoir to a bi-directional actuator which may be made to either extend, contract, or remain stationary depending upon state of an electronically controlled servovalve.

While it is possible to program these actuators to impart an "intelligent" forcing function into a test structure, the time for these actuators to respond to an instantaneous change in the command signal is generally about 0.020 second or longer. If it is assumed (for the sake of later comparison) that a continuous programmed, or "intelligent", forcing function requires 100 defining grid points, then the shortest possible programmed impulse that could be imparted to a test structure using such loading equipment would be 2 seconds or longer. In addition, such actuators require a reaction surface in order to be used.

Alternatively, several loading systems presently exist for spacecraft which require no reaction surface. These fall into a broad classification known as Reaction Control Systems (RCS). Of particular interest to the present discussion are those reaction control systems which comprise small rocket thrusters which may be used for translational as well as rotational control of spacecraft and orbiting structural systems.

Classical RCS thrusters employ a pressurized supply of fuel, an electronically controlled solenoid-type valve, a combustion chamber (if the thruster is of a bipropellant variety) and an expansion nozzle. The control solenoids are normally closed in such systems, and only the duration of the open time is subject to variation. Therefore, while solenoid controlled RCS thrusters can impart differing levels of thrust duration, there is no variation in thrust level (which is controlled by the fixed diameter of the thruster nozzle). Such systems also suffer from a lack of precise impulse bit repeatability due to the opening and closing characteristics of the valves, manifold fill times, and chemical ignition delay times.

A second type of RCS thruster employs a piezoelectric pump for the two fuel components of a bipropellant thruster (see, for example, Kattchee, N., "Piezoelectric Injection System For Vernier Impulse Thrusters," June 1967). This is known as the pulse-pumped vernier engine concept and operates on the principle of pulsing a piezoelectric stack with a specified voltage waveform. The piezoelectric stack is connected to a series of inlet and outlet valves which permit the pump to draw propellant into a holding chamber during a contraction of the stack and to expel the propellant through the outlet valve during an expansion of the stack.

Each such cycle delivers a finite, measurable quantity of fuel to a combustion chamber and subsequently to an expansion nozzle. The frequency of the arrival of the electrical pulses which drive the piezoelectric stack thus determines the total impulse delivered by the thruster during a specified length of time. While this is a useful method for metering precise impulses, the fastest response time thus far achieved has been on the order of 0.01 second, and thus a 100 point "intelligent" load pulse would be at least 1 second in duration, which is too long for accurate identification of higher frequency mode shapes that are presently of interest for spacecraft involving precise pointing requirements. Furthermore, the amplitude (peak force) of the thrust which can be achieved in this manner is severely limited by the maximum stroke of the piezoelectric stack, and thus amplitude modulation to achieve an "intelligent" force-time pulse is not practicable with this approach.

A variety of other piezoelectric valving systems have been heretofore suggested for use in a variety of applications (see, for example, U.S. Pat. Nos. 4,669,660, 5,029,610, 4,431,136, 5,025,766, and 3,055,631), some including amplification of the movement of the piezoelectric device (see, for example, U.S. Pat. No. 4,593,658). These systems, however, suffer many of the same impediments hereinabove noted and/or could not suitably perform functions applicable to the systems and problems addressed by the instant invention.

SUMMARY OF THE INVENTION

This invention provides an apparatus and method for precision identification and control of flexible structures by provision of an "intelligent" forcing function with a duration, or pulse width, of less than 0.01 seconds and with sufficient amplitude so as to be useful for control of real life engineering structures. In particular, duration and amplitude variable thrust control is provided that incorporates a very high speed, electronically controllable valve system which is capable of continuously metering the flow of pressurized gas and/or pressurized propellants through an expansion nozzle to create thrust.

The apparatus includes a valve for retaining fluid under high pressure when in the closed position, means for input of a control signal having a duration and a variable parameter, structure coupled to the control signal means, and a displacement amplifier for amplifying displacement of the structure caused when the control signal is applied thereto. A coupler is utilized to apply the amplified displacement for opening the valve (preferably with the direction of valve opening movement being opposite the direction of displacement of the structure). The apparatus is capable of a repeatable pulse duration of as little as 0.001 second with a lagtime between control signal generation and onset of thrust of as little as 0.0005 second.

The expansion of fluid through the nozzle as the valve core is raised from and lowered to the closed position creates (directly or indirectly) thrust which is directly proportional to the displacement of the valve core, and therefore directly proportional to the control signal (voltage-time history) used to drive the piezoelectric stack. The actual response speed, or delay time, between a step change in control voltage to the stack and the corresponding change in thrust level at the nozzle is determined by the response time of the stack (as little as 10 microseconds utilizing a co-fired piezoelectric stack) and the propagation speed of the resulting stress wave to the valve tip (a lag time of as little as 0.0004 second using the apparatus of this invention). A controllable (repeatable) pulse width (i.e., the total time from onset of measurable thrust through valve closure) is as small as 0.001 second using this invention.

It is therefore an object of this invention to provide a high speed, amplitude variable thrust control apparatus and method.

It is another object of this invention to provide a high speed thrust control apparatus and method for which the amplitude of the force-time pulse is capable of being varied over a wide spectrum of force levels in a continuous manner.

It is yet another object of this invention to provide a high speed, amplitude variable thrust control apparatus which has the capability of applying an arbitrary force-time pulse to a structure without the need of a reaction surface or any support infrastructure.

It is still another object of the invention to provide highly responsive control of bipropellant, monopropellant, and or cold gas reaction control thrusters which may be used for precision control of spacecraft and orbiting structures.

It is still another object of this invention to provide a high speed, amplitude variable thrust control apparatus including a valve for retaining fluid under high pressure when in the closed position, means for input of a control signal having a duration and a variable parameter, structure coupled to the control signal means, a displacement amplifier for amplifying displacement of the structure caused when the control signal is applied thereto and a coupler to apply the amplified displacement for opening the valve (preferably with the direction of valve opening movement being opposite the direction of displacement of the structure). It is yet another object of this invention to provide a high speed, amplitude variable thrust control apparatus and method capable of providing either continuously variable or pusled thrust with a repeatable pulse duration of as little as 0.001 second and with a lagtime between control signal generation and onset of thrust of as little as 0.0005 second.

With these and other objects in view, which will become apparent to one skilled in the art as the description proceeds, this invention resides in the novel construction, combination, arrangement of parts and method substantially as hereinafter described, and more particularly defined by the appended claims, it being understood that changes in the precise embodiment of the herein disclosed invention are meant to be included as come within the scope of the claims.

BRIEF DESCRIPTION OF THE DRAWINGS

The accompanying drawings illustrate a complete embodiment of the invention according to the best mode so far devised for the practical application of the principles thereof, and in which:

FIG. 1 is a front view of a first embodiment of the apparatus of this invention utilized as a cold gas thruster, portions being cutaway to show internal elements;

FIG. 2 is a side view of the apparatus of FIG. 1 showing mounting of an onboard, embedded microprocessor control system and energy storage and control system;

FIG. 3 is a top view of the apparatus of FIG. 1;

FIG. 6 is a detailed illustration of the high pressure valve core rod tip and valve seat of the apparatus of this invention;

FIGS. 7A, 7B and 7C are detailed illustrations of the mechanical displacement amplifier used to multiply and invert the output motion from the piezoelectric stack as used in the apparatus of this invention;

FIG. 8 is a front view of a second embodiment of the apparatus of this invention utilized as a pressure fed hypergolic bipropellant thruster, portions being cutaway to show internal working elements;

FIGS. 9A and 9B are graphic illustrations of test data measuring minimum repeatable pulse width resolution utilizing the apparatus of this invention;

FIG. 10 is a graphic illustration of lag time data utilizing the apparatus of this invention; and FIG. 11 is a graphic illustration of the continuous variability of amplitude of thrust at various continuous drive voltages (as opposed to finite voltage pulses) achievable using the apparatus of this invention.

DESCRIPTION OF THE INVENTION

Figure 5:
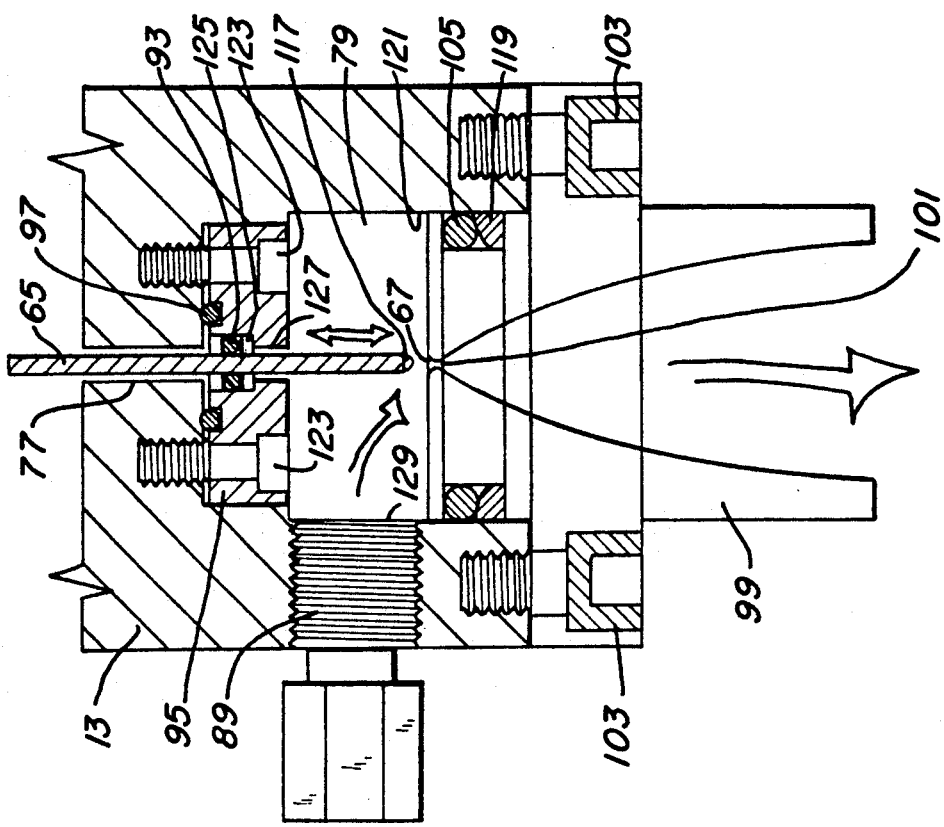
FIG. 5 is a detailed illustration of the high pressure valve seat of the apparatus of FIG. 1.

Referring now to FIGS. 1 through 4, a first embodiment 11 of the invention is shown for use, generally, in a system as a cold gas thruster. Housing 13 anchors the invention to the structure to be controlled or tested, and provides internal reaction points for the moving parts of the invention. Housing 13 is preferably machined from a solid block of high strength, lightweight engineering material (such as aluminum alloy), or otherwise fabricated by such processes as centrifugal casting, injection molding or the like to provide a monolithic unit.

Mechanical action within housing 13 is initiated by input of a direct current voltage signal via electrical connectors 15 and 17 to piezoelectric stack 19 axially oriented in cavity 21 of housing 13. Stack 19 is preferably a monolithic (or "co-fired") piezoelectric (or electrostrictive) stack of a type commercially available (for example, a 0.375 inch by 0.375 inch by 3 inch stack made of PZT for a maximum displacement capability of about 0.003 inch at a full 300 volt control signal). Such piezoelectric stacks are presently capable of producing 0.01% strain when subjected to an electric potential of approximately 300 vdc. This strain is essentially fully developed within 10 microseconds of the application of a step change in voltage to the stack and therefore allows for extremely rapid displacement control, provided an appropriate voltage-time history can be applied to the stack. However, 0.01% strain is insufficient for direct operation, for example, of an effective rocket engine feed line valve. To be practicable, a strain of approximately 0.1% to 0.15% would be required for direct operation of a thruster valve, and thus amplification of the displacement of stack 19 as set forth hereinbelow is required for such applications in order to retain the benefit of such rapid displacement control.

Integral bearing supports 23 and 25 are affixed permanently to both ends of piezoelectric stack 19. These are preferably machined blocks of a high strength engineering material such as hardcoated aluminum alloy, each having a machined, tapered, circular bearing hole, or seat, to which are affixed bearings 27 and 29 (preferably spherical bearings). Bearings 27 and 29 are preferably made of durable, lightweight material with low friction characteristics (for example a ruby-saphire sphere).

Mechanical displacement amplifier 31 includes stiff, anvil-shaped lever 33, unidirectional flexing segment, or hinge, 35 and support 37. Amplifier 31 is monolithically fabricated from a very high strength engineering material having a low modulus of elasticity, and is bolted to housing 13 to thereby reside within cavity 39 such that the plane which is parallel to the face of the amplifier as shown in FIG. 1 (i.e., perpendicular to the axis of rotation of the anvil-lever), and which lies substantially on the centerline through the thickness of the amplifier, also lies substantially on the centerline of through the thickness (i.e., the distance between the tanks as shown in FIG. 3) of housing 13.

Figure 4:
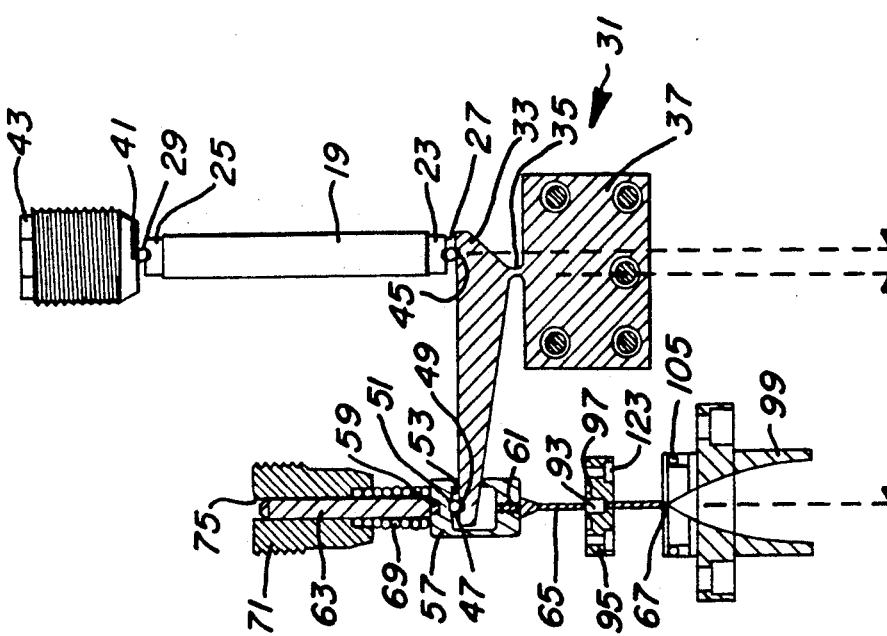
FIG. 4 is a schematic illustration of the moving internal parts of the apparatus of FIG. 1.

As shown in FIG. 4, top bearing 29 of piezoelectric stack 19 mates with tapered, circular bearing seat 41 in the base of threaded nut 43 fabricated from a high strength engineering material such as, for example, hardcoated aluminum alloy. Bottom bearing 27 of piezoelectric stack 19 mates with a similar tapered, circular bearing seat 45 on the top surface of the short side of the lever 33. Threaded nut 43 is used to adjust the vertical position of piezoelectric stack 19 with respect to lever 33 to insure that stack 19 is in compression contact with lever 33 at all operative times. As may be appreciated, bearings 27 and 29 are thus used to insure that all load is transmitted axially through piezoelectric stack 19 to lever 33 and to allow for rotation thereof about hinge 35 without the consequent development of significant resistance to such motion at bearing 27.

Furthermore, bottom bearing 27 and top bearing 29 are positioned in such a manner so as to orient the longitudinal axis of piezoelectric stack 19 in an initially perpendicular orientation with respect to the plane of the top surface of lever 33.

Spherical bearing 47 is maintained in bearing seat 49 in the end of the long side of lever 33 and is in compressive contact with tapered, circular bearing seat 51 in top face 53 of interior slot 55 in core rod coupler 57, through which the long end of lever 33 passes. Core rod coupler 57 is fabricated from a high strength, lightweight engineering material, such as hardcoated aluminum alloy, and has threaded holes 59 and 61 formed at its top and bottom, respectively, to which are affixed guide rod 63 and valve core rod 65, respectively.

Valve core rod 65 is normally held in contact with seat 67 by means of compression spring 69 which reacts against threaded plug 71 which is in turn screwed into threaded borehole 73 on the centerline through the thickness of housing 13. Threaded plug 71 is used to adjust the level of precompression exerted by valve core rod 65 on valve seat 67. Normally this level of precompression is that required to insure that no leakage of high pressure gas and/or propellant occurs at valve seat 67. Guide rod 63 is received in threaded hole 59 on the top of core rod coupler 57 and passes through compression spring 69 and into guide hole 75 which is machined through the centerline of threaded plug 71.

Guide hole 77 having valve core rod 65 therein is machined from housing 13 and communicates with borehole 73 and pressure chamber 79. Guide holes 75 and 77 guide and constrain the motion of valve core rod 65, guide rod 63 and core rod coupler 57. Guide rod 63 and valve core rod 65 are preferably fabricated from a very high strength, high hardness material, for example Vascomax 240 or similar high strength, hardened steel alloys.

In the embodiment of the invention depicted in FIGS. 1 through 3, where the invention is to be operated as a cold gas thruster, onboard high pressure gas reservoirs 81 are connected by high pressure fittings 83 and high pressure tubing 85 to form a single reservoir which is connected directly to pressure chamber 79 by means of fittings 87 and 89 and high pressure tubing 91. Gas reservoirs 81 are charged prior to use by means of an external gas supply which is subsequently disconnected prior to use of the system so that the system can be operated for a period without requirement for outside connection to a gas supply.

Pressure chamber 79 receives gas from the high pressure gas supply through fitting 89 which is a threaded fitting of common availability capable of being sealed in such a manner as to prevent any loss of gas either through the threaded connection into housing 13, or through the junction with supply tube 91. Since pressure chamber 79 is also in communication with borehole 73, which is unpressurized, by way of guide hole 77, a high pressure seal must be provided at this location which both permits axial motion of core rod 65 while simultaneously preventing leakage of gas through guide hole 77. This is accomplished by means of a radial o-ring 93 which seals valve core rod 65 against plate 95. Plate 95 is sealed against housing 13 by means of face o-ring 97. Both o-ring seals, in combination, achieve the necessary seal for pressure chamber 79 while permitting axial motion of valve core rod 65.

Pressure chamber 79 is in communication with expansion nozzle 99 through throat, or fluid passage 101 of expansion nozzle 99. As was previously described, and as discussed in further detail hereinbelow with regard to FIG. 6, high pressure valve seat 67 for valve core rod 65 is formed in expansion nozzle 99 at throat 101. Since one possible method of fabricating housing 13 is to bore pressure chamber 79 from one side of housing 13, for this embodiment of the invention, expansion nozzle 99 may be fabricated separately and subsequently bolted to housing 13 by means of fasteners 103. Sealing of expansion nozzle assembly 99 to housing 13 may be achieved by radial o-ring 105 (as also shown in FIG. 5).

FIGS. 2 and 3 illustrate side and top views of the cold gas thruster embodiment of the invention which show, in addition to those features heretofore described, one possible arrangement for mounting onboard microcontroller subsystem 107 and energy storage and amplification subsystem 109 (preferably including a high slew rate, high amperage, high voltage linear power amplifier) utilized to provide (pursuant to a program stored in microcontroller subsystem 107) the calibrated output voltage for driving stack 19. These are affixed to opposing sides of gas reservoirs 81 by means of brackets 111 which are connected to housing 13 by fasteners 113. It is further illustrated in FIG. 2 and 3 that boreholes, or cavities, 21 and 73 for piezoelectric stack 19 and for guide rod 63 and plug 71, respectively, are machined in such a manner so as to lie on the plane which passes through the centerline of the thickness of housing 13. Bracket 115, shown in FIG. 3, is provided with threaded holes which may be used to mount the invention on the structure to be controlled and/or tested.

Microcontroller subsystem 107, with appropriate feedback data, may be used to enhance and refine repeatability. For example, on-board memory can be used to store data indicative of event characteristics, structural response characteristics (i.e., the responses to loading of the structure to be controlled and/or tested, such as force and acceleration feedback) and control signal parameters. The resident program of the microcontroller may then be applied to refine control signal parameters in view of the data to optimize testing and/or controlling of the structure.

Referring now to FIGS. 4 and 5, during operation, a step change in positive direct current voltage will cause piezoelectric stack 19 to expand to a degree proportional to the step change in voltage. Since stack 19 is connected to a rigid internal reaction surface at bearing seat 41, all expansion occurs at the lower end and is transferred through bearing 27 to tapered bearing seat 45 which is machined on the short side of lever 33. The vertical displacement of piezoelectric stack 19 therefore causes bearing seat 45 on lever 33 to be moved downward and for lever 33 to rotate about hinge 35. Consequently, and as will be explained in detail below, bearing 47 on the long side of lever 33 is caused to move upward to thus unseat valve core tip 117 from valve seat 67 and initiate loading as gas is expanded through nozzle 99.

This inversion of displacement direction is required because piezoelectric stack 19 is unable to effectively transmit loads in tension and because of the flow requirements through nozzle 99 (i.e., typically in this embodiment laminar flow of the high pressure fluid flow through nozzle 99 is required). A positive return mechanism must be available to close core tip 117 against valve seat 67 for the same reason. This is effectively accomplished by compression spring 69 which is chosen such that the precompression force satisfies two criteria: first, it must be capable of sealing valve seat 67 such that no gas and/or propellant is permitted to escape through expansion nozzle 99 when piezoelectric stack 19 is in the uncharged state; and second, the precompression force must be capable of accelerating lever 33 and valve core rod assembly (valve core rod 65, guide rod 63 and coupler 57) downward towards a closed valve position in such a manner as to always exceed the contracting acceleration of piezoelectric stack 19 as the voltage signal which drives the stack is diminished. This is required in order to maintain all bearings (27, 29, and 47) in a state of continual compression to avoid the possibility of separation and subsequent shock loading and noise in the impulse.

FIG. 5 is a detailed illustration of pressure chamber 79. In the preferred embodiment of the invention, this chamber is milled from housing 13 as a circular borehole. Radial o-ring 105 and optional backup ring 119 provide a high pressure static seal between nozzle 99 and circular wall 121 of chamber 79. Fasteners 103 are sized to resist the resultant force acting to expel nozzle 99 from housing 13 due to the high internal pressure inside pressure chamber 79. Face o-ring seal 97 is precompressed against housing 13 by plate 95 by means of fasteners 123 and prevents escape of gas around plate 95 and into guide hole 77. O-ring seal 93 and optional backup rings 125 prevent escape of gas through guide hole 127 in plate 95 through which valve core rod 65 passes. Seal 93 additionally serves as a viscous damper for valve core rod 65 to thereby minimize elastic rebound when core rod tip 117 closes with valve seat 67.

Upward motion of valve core rod 65 will permit high pressure gas to expand through nozzle 99 and thus create thrust 50 (in the direction indicated by the arrow). In furtherance thereof, high pressure gas and/or propellant received through supply inlet 129 to chamber 79 is delivered through fitting 89 and gas supply tubing 91 which have internal diameters significantly larger than the throat diameter (D in FIG. 6) of throat 101 of expansion nozzle 99 in order to maintain fully developed flow at all times when the valve is open.

FIG. 6 is a detailed illustration of the relationships of valve core tip 117 if valve core rod 65 and valve seat 67 (in combination, providing a volumetric control valve capable of producing metered gas flow to nozzle 99 having suitable laminar flow characteristics for the degree of control necessary in the contemplated applications of the invention herein disclosed). Valve core rod mating surface 131 is precision ground to have a slope A, for example of 29.5 degrees, and thus an included angle of 59 degrees. Core rod tip 117 is precision ground to a flatter angle B, for example of approximately 30 degrees from horizontal (120 degrees included angle), so as not to come into contact with valve seat 67. Valve seat 67 is machined with a tapered angle C, for example of 30 degrees (a 60 degree included angle). Since angle C is slightly larger than angle A, initial sealing of the valve occurs at expansion nozzle throat 101.

FIG. 7A, 7B and 7C illustrate in detail rigid lever 33, hinge 35, and support 37. During normal operation, expansion of piezoelectric stack 19 in response to a controlled step change in the direct current signal will in turn exert force on tapered circular bearing seat 45 on the short side of the lever 33 whose fulcrum is approximately defined at hinge 35. In turn lever 33 rotates clockwise about hinge 35 causing bearing seat 49 on the long side of lever 33 to be forced upward, thereby generating force as it reacts against precompression spring 69 (see FIG. 4). The upward displacement at bearing seat 49 has been shown to be, to within four significant figures, equal to the expansion of piezoelectric stack 19 times the ratio of length E divided by length F.

The tapered shape of hinge 35 is necessary in order to minimize both the mass of the lever (in order to reduce inertially induced forces and moments as the piezoelectric stack expands) as well as to minimize flexural deformations relative to the undeformed top surface of the lever due to the action of applied forces at seats 45 and 49. Hinge 35 is designed to be as thin as possible in order to minimize rotational resistance about an axis perpendicular to the principal plane of the amplifier. The height G of the hinge is selected to be as tall as possible while avoiding the possibility of buckling under the combined compressive loads at seats 45 and/or 49. The hinge width H is selected to prevent both bearing failure of the hinge as well as to inhibit the likelihood of lever 33 resonating in a torsional mode. These design criteria lead to the requirement for the amplifier to be fabricated from a very high strength, low modulus material with a relatively long linear elastic stress-strain curve such as titanium alloy. Preferably, mechanical displacement amplifier 31 is monolithically milled from the same base block of such material so that an overall integrated unit is provided (i.e., hinge 35 is integral to both lever 33 and support 37 while yet providing negligible resistance to desired rotation).

In order to minimize stress concentration and to alleviate the likelihood of fatigue cracking, hinge 35 is machined or otherwise fabricated with curved interfacing radii I lever 33 and support 37. Hinge width H (and also the width of lever 33) is less than width J of support 37 such that when support 37 is affixed to housing 13 by means of fasteners 133 there will be no interference with the housing wall as lever 33 rotates.

FIG. 8 illustrates a second embodiment 135 of the invention for a pressure-fed bipropellant thruster of a type that can be used for very high precision attitude control of spacecraft. There are several fundamental differences between the operation of the invention shown in FIG. 8 and that for the cold gas thruster described in FIGS. 1 through 3. The primary difference is that the propellant medium consists of two liquids which are stored inside non-reactive chambers 137 and 139 (an oxidizer in chamber 137 and a fuel in chamber 139). Chambers 137 and 139 are in turn pressurized by means of high pressure inert gas sources 141 and 143 which are in turn connected by means of delivery tubes 145 and 147 to expansive bladders 149 and 151 which expand and pressurize chambers 137 and 139, respectively, in such a manner as to occupy the volume of space vacant of oxidizer or fuel and to apply uniform pressure to the remaining oxidizer or fuel.

Acting under the influence of the high internal pressure from pressure vessels 141 and 143, oxidizer and fuel are forced to flow through delivery tubes 153 and 155, respectively, which communicate with valve chambers 157 and 159, respectively. Elements 141, 145, 149, 137 and 153 comprise oxidizer pressure-fed delivery system 161. Elements 143, 147, 151, 139 and 155 comprise fuel pressure-fed delivery system 163.

Functional unit 165 is comprised of all of the basic components described for the high speed valve system in FIGS. 1 through 7 less the cold gas supply system and expansion nozzle 99. Unit 165 provides for highly responsive monitoring and metering of oxidizer from valve core chamber 157 through valve seat 167. Unlike the cold gas thruster embodiment of the invention, valve seat 167 is in communication with delivery tube, or passage 169 which is in communication with combustion chamber 171. A supplementary nozzle 173 may be used to direct and disperse the flow of oxidizer into combustion chamber 171.

Functional unit 175 is likewise comprised of all of the basic components heretofore described in FIGS. 1 through 7 less the cold gas supply system and expansion nozzle 99. Unit 175 provides for highly responsive monitoring and metering of fuel from valve core chamber 159 through valve seat 177. Again, unlike the cold gas thruster embodiment of the invention, valve seat 177 is in communication with delivery tube, or passage 179 is in communication with combustion chamber 171, and a supplementary nozzle 181 may be used to direct and disperse the flow of fuel into combustion chamber 171.

A typical oxidizer for use in embodiment 135 of the invention may be nitrogen tetroxide whereas a typical fuel may be monomethyl hydrazine, although any oxidizer and fuel combination which is hypergolic in nature may be utilized. The impingement pattern of nozzles 173 and 181 may be optimized to produce uniform and complete burning of the constituents within combustion chamber 171. The combustion products are then expanded through nozzle 183 to produce thrust. It may be appreciated that, due to the ability to place valve unit 165 and valve unit 175 under separate microprocessor control, the mix ratio of fuel to oxidizer, as well as the flow rates to combustion chamber 171 can be varied at extremely rapid rates so as to be able to create, on demand, either very small, very rapid control forces or large, rapid control forces (as determined to be necessary depending, for example, on the nature of the dynamic disturbing force which must be damped, an attitude control maneuver which must be initiated, or a pointing requirement which must be maintained with a high degree of precision). The reaction control system embodied in FIG. 8 makes possible extremely rapid control response, as well as very high precision in both small and large applied forces.

As may be appreciated, this invention provides apparatus and methods for amplitude variable thrust control useful in the precision attitude control and/or pointing and stabilizing of spacecraft and satellites (resulting in less fuel consumption, cycle time between acquisition of new targets, and finer pointing stabilization), precision process control as a reagent addition system for semiconductor processing were corrosive and/or doping gases must be metered precisely to achieve desired deposition or substrate removal thicknesses on the order of a micron, structural research, automotive and/or aerospace fatigue testing, or even active control of buildings during earth quake or high wind conditions to provide real time damping of lateral forces acting on the building. Testing has shown the apparatus to provide a minimum controllable pulse width of 0.001 second with a lag time between control signal to the piezoelectric structure and the onset of thrust of about 0.0004 second, amplitude of the force-time pulse being variable over a wide spectrum of force levels in a continuous, or linear, manner, as illustrated by the test data in FIGS. 9 through 11.

What is claimed is:

1. A thruster comprising;

first storage means for storing at least a first fluid under pressure;

a thruster nozzle;

a controller for developing and generating a control signal; and first high speed, pulse duration and amplitude variable valving means operatively associated with said first storage means, said controller and said thruster nozzle for metering said first fluid from said first storage means to selectively produce either of continuously variable and pulsed thrust through said thruster nozzle and being capable of a repeatable pulse duration of less than 0.01 second and a lag time between control signal generation and onset of thrust of less than 0.01 second.

2. The thruster of claim 1 wherein said thruster is one of a cold gas, monopropellant, and bipropellant reaction control thruster.

3. The thruster of claim 1 wherein said valving means includes a co-fired piezoelectric stack capable of fully developed strain within about 10 microseconds.

4. The thruster of claim 3 wherein said valving means includes a mechanical displacement amplifier engaging said stack for amplifying displacement caused by said strain.

5. The thruster of claim 1 wherein said control signal has a duration and a variable parameter, and wherein said valving means includes c core and a seat movement of said core allowing metering of said first fluid, said movement being proportional to said variable parameter of said control signal.

6. The thruster of claim 1 further comprising second storage means for storing a second fluid, second valving means and a chamber for receiving said first fluid metered through said first valving means and having said nozzle connected therewith, said second valving means being a high speed, pulse duration and amplitude variable valving means operatively associated with said second storage means and said controller for metering said second fluid from said second storage means to said chamber.

7. A high speed, amplitude variable thrust control apparatus for use with a high pressure fluid supply, said apparatus comprising:

a thruster unit;

valve means configured to retain the fluid under high pressure when in the closed position;

control signal input means for selectively providing a control signal having a duration and a variable parameter;

structure connected with said control signal input means and capable of structural response producing a known amount of displacement in a first direction proportional to said variable parameter of said control signal when said signal is provided from said control signal input means to said structure;

a displacement amplifier operatively associated with said structure for amplifying said displacement; and coupling means for applying said amplified displacement to open said valve means and thus meter a volume of the fluid therethrough proportional to said variable parameter of said control signal.

8. The apparatus of claim 7 wherein said amplifier is a mechanical displacement amplifier comprising a monolithically milled lever, hinge and support, said amplifier configured to reverse direction of said amplified displacement from said first direction.

9. The apparatus of claim 7 wherein said variable parameter is voltage level, and wherein said structure includes a co-fired piezoelectric stack.

10. The apparatus of claim 7 wherein said valve means has a core and a portion integral with said thruster unit, said core being displaced an amount proportional to said control signal variable parameter to allow fluid movement through said portion.

11. The apparatus of claim 1 wherein said control signal input means includes a microcontroller.

12. The apparatus of claim 7 wherein said valve means includes a valve seat integral with a throat of said thruster unit and biasing means for positive return of said valve means to said closed position.

13. A high speed, amplitude variable thrust control apparatus for use with a high pressure fluid supply, said apparatus comprising:

a thruster unit having a fluid passage;

valve means configured to retain the fluid under high pressure when in the closed position and including a valve seat integral with said fluid passage of said thruster unit;

control signal input means for providing a selectively variable control signal;

structure connected with said control signal input means and capable of structural response producing a known amount of displacement in a first direction proportional to said variable control signal when said variable control signal is provided from said control signal input means to said structure; and coupling means for opening said valve means responsive to said displacement produced by said structure to thereby meter a volume of the fluid through said valve seat of said valve means proportional to said variable control signal.

14. The apparatus of claim 13 further comprising a displacement amplifier operatively associated with said structure for amplifying said displacement, said coupling means applying said amplified displacement to open said valve means.

15. The apparatus of claim 13 wherein said control signal input means develops said variable control signal having a signal duration as short as 0.001 second.

16. The apparatus of claim 13 wherein said valve means begins to open within as little as 0.0005 second of provision of said variable control signal from said control signal input means to said structure.

17. The apparatus of claim 13 wherein said control signal input means develops said variable control signal including a selected duration and a selected voltage level.

18. The apparatus of claim 13 wherein said control signal input means includes storage and processing means for storing operational data and utilizing said data to refine said variable control signal and thereby desired thrust response.

19. The apparatus of claim 13 wherein said thruster unit includes a chamber for receipt of said metered volume of said fluid through said valve seat of said valve means and for mixing thereat with a second fluid metered independently into said chamber.

20. The apparatus of claims 13 wherein said fluid passage of said thruster unit is a throat.

* * * * *